Jan. 24, 1967   W. HOLZER   3,300,595
DEVICE FOR MAKING A MOMENTARY CONTACT
Filed Nov. 12, 1964

$$D = \frac{13}{12} d$$

INVENTOR:
WALTER HOLZER
BY Toulmin & Toulmin
ATTORNEYS

United States Patent Office 3,300,595
Patented Jan. 24, 1967

3,300,595
DEVICE FOR MAKING A MOMENTARY CONTACT
Walter Holzer, Drosteweg 19, Meersburg
(Bodensee), Germany
Filed Nov. 12, 1964, Ser. No. 410,404
Claims priority, application Germany, Nov. 15, 1963,
H 50,852
6 Claims. (Cl. 200—19)

The invention relates to a device for making a momentary contact, for example an impulse transmitter for time switches, using indexing plates which are driven permanently, e.g. through gearing and have recesses which cause the contact to be made by contact springs clicking into said recesses.

It is the object of the invention to construct the device so that switching is performed with a high degree of functional reliability whilst keeping the device itself easy and economical to manufacture even for the most widely diverse impulse times, and requiring only a minimum of space.

Devices for making a momentary contact are already known. With these devices which are used particularly as time contact systems for timers, the problems reside in the fact that one impulse contact has to be closed for half a second at fairly long intervals of time, e.g. every two minutes.

With an ordinary, rotating cam, this problem is not an easy one to resolve because, for example with two minutes' rotation time and a half second impulse, the contact must be made within ¹⁄₂₄₀ part of the periphery, or within just ¹⁄₃₆₀ part of the periphery in the case of a three minute rotation time. Therefore, it is necessary to use either a very large switching cam or an indexing plate of very large circumference, in order to carry out this switching operation with sufficient accuracy or, in the case of a small indexing plate periphery, very high accuracy is necessary in manufacture.

It is known to drive the indexing plates from a permanently running drive, through gearing. With this construction, it is true, a switching time, for example of half a second, can be achieved with sufficient accuracy, by virtue of the quickly rotating indexing discs, but then this switching must be masked or cut out during the pause period, for which again particular devices are required.

It is the object of the invention to avoid these disadvantages and yet, whilst using a gearing and indexing plate, nevertheless to achieve momentary and accurate switching times after long pauses.

The problem is solved according to the invention by the gearing being a coincident gear with each of the gear wheels having recesses for switching paths.

With this construction, therefore, an entirely new direction is pioneered in contact making. Coincident gears of this type are distinctive in that one wheel revolves regularly whilst the other moves eccentrically but at one point is virtually stationary with the other wheel, at which point it does not roll and so therefore performs a stroke movement, rendering this position particularly suitable for switching.

There are all manner of possibilities of designing this gear. A preferred embodiment consists in two indexing discs of different diameter being formed simultaneously as gear wheels, the smaller being eccentrically mounted in relation to the larger, so that the outer periphery of the inner wheel coincides with the inner periphery of the outer wheel in the switching position, without any riding movement.

In this brief point in time during which both wheels are to a certain extent stationary in respect of each other, switching occurs. The space required for such a construction is very small because, of course, the wheels are mounted in each other. Also, this construction is not very susceptible to breakdown because the inner wheel is shielded by the outer and the teeth on the inner wheel are not readily accessible to dirt or mechanical damage from outside.

It is of course possible, using the same principle for example to use externally toothed wheels to make the contact, or a plurality of wheels forming the gear.

As regards constructing a gear with two gear wheels mounted one inside the other, it is important for the inner and outer wheel to have recesses which are scanned by fixedly arranged sets of contacts.

According to the desired impulse sequence, a various number of recesses may be provided. The recesses can also be constructed in any conceivable manner. It is only essential always that, at a definite position of the recess in relation to the recess on the other wheel, a stroke or lift movement occurs which makes the contact. For example, the recesses could be replaced by magnetic click-stop devices or levers which engage in the recesses.

A preferred embodiment is for the inner and outer wheel each to have at least one recess, so arranged that the two coincide in the switching position and hence make the contact.

With this construction, a contact spring for example, which operates the contact as it moves, is scanningly attached to one wheel. When one recess, e.g. of the outer wheel, is below this contact spring, the contact spring is still unable to engage and make the contact because the spring is so wide that the other part of its width is resting either on the circumference of the inner wheel and can only engage when the recess in this latter wheel coincides or is over the recess in the inner wheel at a time when the recess in the outer wheel has moved on.

The event of both recesses coinciding therefore occurs relatively rarely, having regard to the inner wheel which rotates far more quickly. The result is that, during a long switching pause, it is nonetheless possible to achieve a momentary switching time with great accuracy, namely at the moment when both recesses coincide.

For this function, it is important for the inner and outer wheel each to have one recess and, for equal modulus, for the inner wheel to have one tooth less than the outer wheel. With this arrangement, therefore, the two recesses will coincide when the outer wheel has made one complete revolution.

It is readily possible to alter the ratio of the switching pause to the switching time. All that is always necessary is for the number of recesses to correspond to the difference in the numbers of teeth in the inner and outer wheels.

There are also manifold possibilities as regards drive. One construction is for the gear of indexing wheels to have teeth. However, it is just as readily possible for the gear or indexing wheels to have friction surfacing in their peripheries. In other words, the gear may be operated by positive or operative means.

The wheels, likewise, may be variously mounted.

One construction consists of the inner wheel being rigidly mounted on a drive shaft arranged eccentrically to the axis of rotation of the outer wheel. Therefore, with this construction, the drive comes from the inner wheel.

It is likewise possible to mount the outer wheel rigidly on the driving shaft whilst the inner wheel is mounted eccentrically to the outer wheel.

The essential requirement always is that the inner wheel should have a proportionally much greater speed of revolution than the outer wheel and should describe an eccentric path in relation to the outer wheel. Naturally, any other kinematic inversions are equally possible.

As regards manufacture of such a gear, it is expedient for rounded, intermeshing projections and tooth spaces to form the gear teeth.

With this construction, the gear wheels may be extruded from plastic. In spite of this per se inaccurate manufacturing method, sufficiently accurate working is possible because the size of the recesses make it possible to compensate for any inaccuracies in the gears.

Instead of this construction of gears, it is also possible to use other forms, based for example on the principle of the Maltese cross. It is always essential for one wheel or one switch carrier to have a regular rotary movement which is even in relation to an axis, whilst the other switch carrier which has the recess in it becomes periodically close to and remote from the first switch carrier. Whether the construction involves for example an eccentrically mounted wheel or a Maltese cross which, at regulable intervals of time, passes by a recess on the switch carrier, is immaterial.

Forms of embodiment of the invention are illustrated in the drawings, further features of the invention emerging from the description and drawings, in which.

Figure 1:
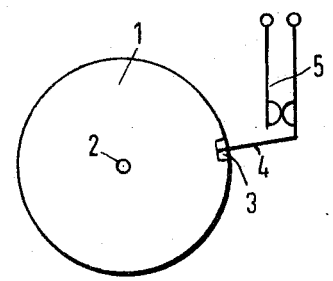
FIGURE 1 is an impulse transmitter corresponding to the state of the art.

FIGURE 1 shows an indexing disc 1 which is driven for example by a permanently running drive (not shown) through spindle 2. A recess 3 in the indexing disc is scanned by the contact spring 4 of a set of contact springs 5. If recesses are provided, then operating contacts are used; if cams are provided, then inoperative contacts are used.

Figure 2:
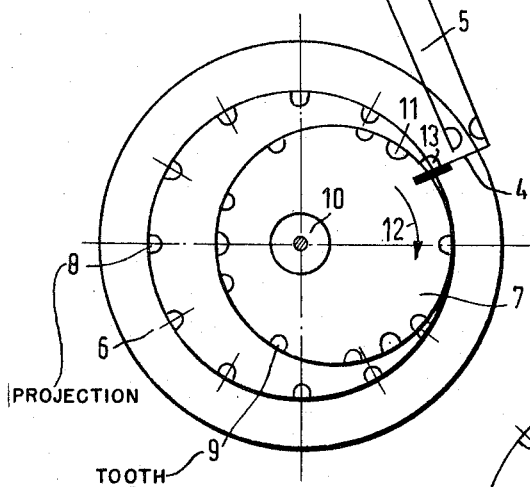
FIGURE 2 shows a plan view of an impulse transmitter having an inner and an outer wheel.

FIGURE 2 shows an outer gear wheel 6 and an inner gear wheel 7. Diagrammatically illustrated projections 8, serving as internal teeth on the outer gear wheel 6 engage in the corresponding, diagrammatically illustrated tooth gaps 9 on the inner gear wheel 7. Inner gear wheel 7 is eccentrically mounted by the eccentric member 10, so that it performs a riding movement as is known per se in such gears, inside the outer gear wheel 6.

In the position shown, recess 11 in the inner gear wheel 7 will, as the said wheel moves in the direction of arrow 12, coincide with recess 13 provided in the outer gear wheel 6. At the moment when both recesses 11, 13 coincide, the contact spring 4 engages therein and contact spring set 5 makes its contact.

Figure 3:
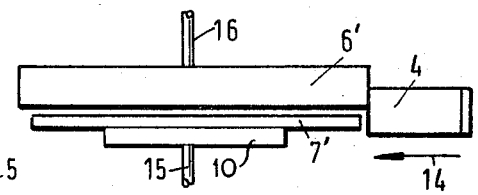
FIGURE 3 shows a further embodiment of an impulse transmitter.

In FIGURE 3 there is shown another embodiment of the impulse transmitter of the present invention. As shown, contact spring 4 is of a width such that it rests partly on index disc 6', and partly on index disc 7'. Spring 4 can only make contact in the direction of arrow 14 when recesses (not shown) in the peripheries of discs 6' and 7' coincide. Disc 7' is rotated eccentrically with respect to disc 6' by means of eccentric member 10 connected to disc 7' and mounted on driving shaft 15. Disc 6' rotates about shaft 16.

FIGURE 4 again shows the moment of making contact, the recesses coinciding when the inner gear wheel is at its maximum distance from the driving shaft 15 at the switching point 17.

Figure 4:
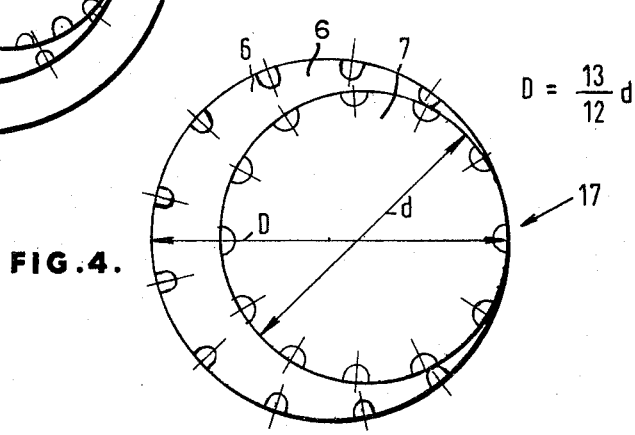
FIGURE 4 shows a diagram of the impulse transmitter which has one recess each on its inner and outer gear wheels.

The moment of switching depends upon the distance at which the recesses are provided on the inside of the outer gear wheel 6. The inner gear wheel 7 can, according to the number of teeth elected, frequently adopt this position which is shown in FIG. 4. According to how many recesses are provided on the outer gear wheel 6, so this will occur at least once during one revolution of the outer gear wheel 6 but, in extreme cases, it can occur as frequently as the inner gear wheel assumes the position shown in FIG. 4.

If, in one revolution of the outer gear wheel 6 as drawn, switching occurs only once, then the diameters and numbers of teeth are given by the relationship $$D = \frac{13}{12} \times d$$

In this example, D is the diameter of the outer and $d$ the diameter of the inner gear wheel; 13 is the number of teeth on the outer and 12 the number of teeth on the inner gear wheel.

There are all manner of possibilities of using the invention in order, with a permanently running drive, to achieve a switching action by one wheel performing only one lifting action in the switching position, which at the same time avoids wear on the contact spring when contact is made.

I claim:

1. A device for making a momentary contact comprising contacts, at least two discs, one disc connected to a continuous drive and driving the other disc, said discs being eccentrically journalled within each other, the inner disc eccentrically journalled to its shaft, each of said discs having radial recesses therein, such that rotation of said discs causes periodic registration of said recesses, a spring biased radially displaceable switching member having a front edge which, upon registration of said recesses of said discs, will engage said recesses, thus causing operation of said contacts.

2. A device according to claim 1 wherein said discs are provided with gearing.

3. A device according to claim 2 wherein said discs are geared with equal modulus, each of said discs being provided with a recess, the number of teeth of one of said discs being one less than the number of teeth on the other of said discs.

4. A device according to claim 2 wherein said discs are provided with a number of recesses which correspond to the difference between the numbers of teeth of the two geared discs.

5. A device according to claim 1 wherein said discs are provided with a frictional lining at the peripheral surface.

6. A device according to claim 2 wherein said gearing comprises rounded protrusions on one of said discs and interlocking mounted indentations on the other of said discs.

References Cited by the Examiner

UNITED STATES PATENTS

| 1,795,420 | 3/1931 | Beall | 192—142 |
| 2,029,821 | 3/1936 | Hathaway | 200—47 |
| 2,123,052 | 7/1938 | Kearsley | 200—30 |
| 2,424,116 | 7/1947 | Puerner | 200—38 |
| 2,668,588 | 2/1954 | Hamilton | 200—35 X |
| 3,226,021 | 12/1965 | Dusinberre | 200—19 X |

FOREIGN PATENTS

| 196,116 | 2/1908 | Germany. |

BERNARD A. GILHEANY, *Primary Examiner.*

H. M. FLECK, G. J. MAIER, *Assistant Examiners.*